United States Patent [19]

Porta et al.

[11] Patent Number: 5,182,868
[45] Date of Patent: Feb. 2, 1993

[54] METHOD AND APPARATUS FOR DRYING THE ENDS OF A BUNDLE OF HOLLOW FIBERS FOR A MEMBRANE DEVICE MADE UP OF HOLLOW FIBERS

[75] Inventors: Julien Porta, Chavanoz; Christian Clermont, Morance, both of France

[73] Assignee: Hospal Industrie, Cedex, France

[21] Appl. No.: 729,387

[22] Filed: Jul. 12, 1991

[30] Foreign Application Priority Data

Jul. 13, 1990 [FR] France .................... 90 09199

[51] Int. Cl.⁵ .............................................. F26B 7/00
[52] U.S. Cl. ................................... 34/18; 34/23; 34/214; 34/107; 34/209
[58] Field of Search ............. 34/209, 210, 214, 215, 34/18, 148, 68, 107, 23

[56] References Cited

U.S. PATENT DOCUMENTS

| | | | |
|---|---|---|---|
| 294,510 | 3/1884 | Sargent | 34/214 |
| 526,201 | 9/1894 | Saulmann | 34/214 |
| 2,661,544 | 12/1953 | Tanasse | 34/214 |
| 3,142,171 | 7/1964 | Royen | 34/214 |
| 4,237,596 | 12/1980 | Hughes et al. | 29/401.1 |

FOREIGN PATENT DOCUMENTS

0044075A1 1/1982 European Pat. Off. .
0203378A2 12/1986 European Pat. Off. .
892098 3/1962 United Kingdom .

Primary Examiner—Henry A. Bennet
Assistant Examiner—Denise L. F. Gromada
Attorney, Agent, or Firm—Finnegan, Henderson, Farabow, Garrett & Dunner

[57] ABSTRACT

The invention permits the ends of a hollow fiber bundle to be dried, without drying the intermediate portions of the bundles, thereby enabling the bundle to be potted. The apparatus includes at least one drying member having two couplings for coupling a source of forced hot air to respective ends of a sheath designed to contain a bundle of hollow fibers. At each of its ends, the sheath includes at least one axial opening through which the hot air penetrates into the sheath, and at least one lateral opening through which the hot air leaves the sheath after passing over the ends of the fibers. The inlet air flow rate to the sheath and the dimensions of the openings are selected so that all of the air entering each of the ends of the sheath leaves via a corresponding lateral opening.

12 Claims, 2 Drawing Sheets

METHOD AND APPARATUS FOR DRYING THE ENDS OF A BUNDLE OF HOLLOW FIBERS FOR A MEMBRANE DEVICE MADE UP OF HOLLOW FIBERS

BACKGROUND OF THE INVENTION

1. Field of the Invention

The invention relates to a method and to apparatus for drying the ends of a bundle of hollow fibers for any membrane device in which the membrane is constituted by a bundle of hollow fibers that need to be kept moist and that need to be assembled to one another by gluing over a portion of their length.

2. Description of the Related Art

Such membrane devices are used in a variety of fields, and they are specifically adapted to their fields in particular by the selected chemical nature of their membranes. This category of membrane device includes, for example, certain types of water filter, reverse osmosis devices as used in particular for desalinating brine, and hemodialysers used for purifying the blood of people suffering from kidney failure, by dialysis and/or by filtering.

To illustrate the method of the invention and the apparatus for implementing it, the description below uses the example of hemodialysers, but it should be understood that this does not mean the invention is limited in any way to medical applications only.

In conventional manner, a hollow fiber hemodialyser includes a bundle of hollow fibers disposed in a tubular housing and held therein at both ends by gluing by means of a seal in which the fibers are embedded over a portion of their length, with the ends of the fibers being left open. The seals are installed so as to delimit a sealed chamber inside the housing. Endpieces are fitted to each of the ends of the housing whereby blood enters and leaves the housing by flowing along the inside of the fibers, with the housing further including two lateral ducts opening out into the sealed chamber whereby a dialysis liquid enters and leaves said chamber, which liquid therefore flows over the outsides of the fibers.

Whenever the fibers used need to be kept moist, and for whatever reasons, the manufacture of hemodialysers of this type suffers from a major technological difficulty which lies in the fabrication of the above-mentioned seals (the so-called "potting" operation). This applies, in particular, when the fibers are made of a material such as the copolymer of acrylonitrile and sodium methallyl sulfonate known under the trademark AN 69 which is made microporous by an appropriate method and which retains its structural characteristics only if it is kept moist. This also applies to fibers made of a material such as regenerated cellulose known under the trademark CUPROPHAN, which material is moistened in order to facilitate sterilization with ethylene oxide as applied to the hemodialyser at the end of manufacture.

The technological difficulty mentioned above is due to the fact that, at present, there exists no known glue capable of adhering to fibers having a water content above a certain value, which value is greatly exceeded with the fibers mentioned above.

To overcome this difficulty, French patent No. 72 29200 proposes a method of manufacturing a high pressure seal around a bundle of hollow fibers for a reverse osmosis device in which, to enable the sealforming glue to adhere to the fibers, that portion of the fibers which engages the glue is dried prior to gluing while the portion of the fibers that is to play an active role in the assembled device is kept moist. According to that patent, this result is achieved by coating the fibers with an elastomer material close to one end of the bundle of fibers to create a barrier between the end of the fibers that is to be engaged in the seal and the active portion of the fibers. The active portion of the fibers is immersed in an aqueous gelatin solution and because of the elastomer barrier, this solution is prevented from soaking the ends of the fibers by capillarity. The solution is cooled to solidify the gelatin. The ends of the fibers are dried and glue is then cast around them to form the seal. Finally, the gelatin surrounding the active portion of the fibers is removed, which gelatin has served to keep this portion of the fibers moist while the end of the bundle was being dried.

That method suffers from several drawbacks: it is heavy to implement; it is ill-suited to manufacturing membrane devices having substantially rectilinear bundles of fibers (e.g. the above-described hemodialysers); and it requires the fibers to be put into contact with various substances that constitute potential sources of pollution, which must be avoided absolutely with membrane devices for medical purposes.

SUMMARY OF THE INVENTION

An object of the present invention is to provide a method for drying the ends of a bundle of hollow fibers which is suitable for industrial manufacturing, which does not pollute the fibers, and which is suitable for preparing bundles of fibers for devices of various structures.

To achieve this object, the present invention provides a drying method for drying the ends of a bundle of hollow fibers for a membrane device comprising hollow fibers, the method consisting in placing the bundle in a sheath having at least one axial opening and at least one lateral opening at each of its ends, and in forcing in air simultaneously via the axial openings, with the inlet air flow rates to the sheath and the sizes of the openings being selected so that all of the air penetrating at each end of the sheath leaves via the corresponding lateral opening. Advantageously, the sheath is constituted by a housing of the membrane device, which housing is designed to contain the bundle of hollow fibers.

According to a characteristic of the invention, the air inlet flow rates to the sheath are substantially equal, with the axial openings of the sheath being of substantially the same size, as are the lateral openings.

According to another characteristic of the invention, the forced air is heated. Compared with air at ambient temperature and having the same absolute humidity (which in any event is kept as low as possible), hot air has the advantage of providing faster drying.

The invention also provides apparatus for implementing the method. The apparatus comprises at least one drying member including two couplings for connecting a source of forced air to respective ones of the ends of a sheath provided for containing the bundle, said sheath including at each of its ends at least one axial opening through which air is injected into the sheath and at least one lateral opening through which air leaves the sheath, the sheath advantageously being constituted by a housing of the membrane apparatus, which housing is designed to contain the bundle of hollow fibers. Advantageously, the apparatus includes means for heating the air.

According to a characteristic of the invention, the axial openings of the sheath are of substantially equal size, the lateral openings are of substantially equal size, and the couplings are connected to a common source of forced air via ducts having substantially the same length and the same diameter.

According to another characteristic of the invention, the drying apparatus includes a plurality of drying members connected to a single source of forced hot air, and each drying member includes calibrated leak means so that air escapes from an empty drying member and from a sheath containing a bundle installed on a drying member at substantially equal rates. This disposition has the advantage that when bundles of hollow fibers are dried in series, drying is uniform from one bundle to another regardless of whether the drying apparatus is loaded fully or only in part.

BRIEF DESCRIPTION OF THE DRAWINGS

Other characteristics and advantages of the invention appear from reading the following description given with reference to the accompanying drawings, in which.

DESCRIPTION OF THE PREFERRED EMBODIMENT

Figure 1:
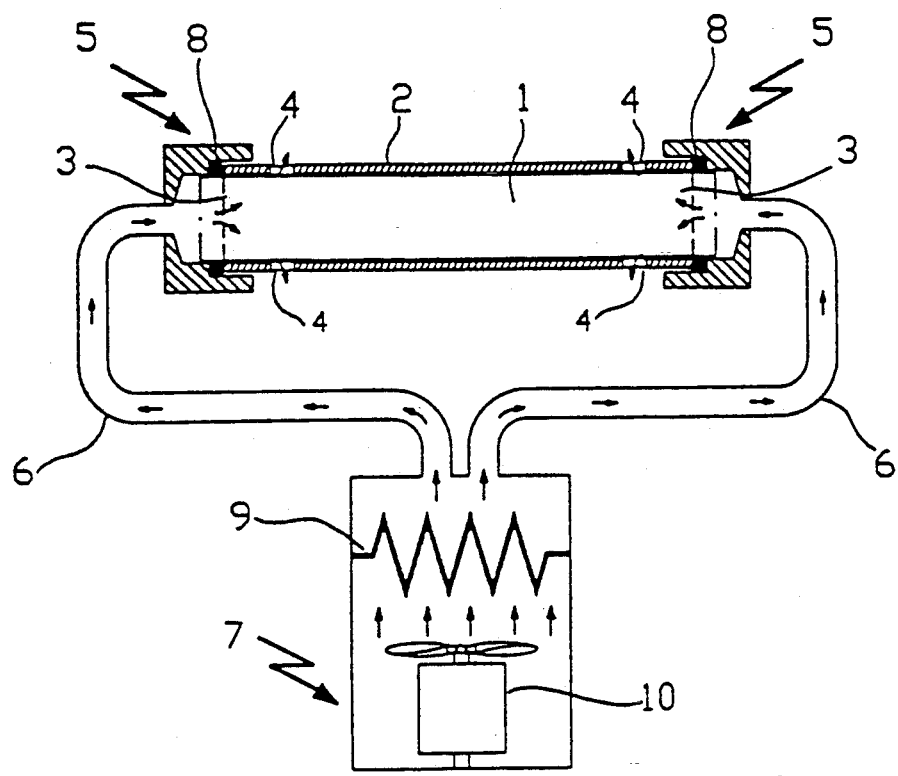
FIG. 1 is a diagrammatic view, partially in section, showing a drying apparatus of the invention.

The drying apparatus shown diagrammatically in FIG. 1 comprises a drying member for a bundle of hollow fibers 1 disposed inside a tubular sheath 2 which is open at its ends (axial openings 3) and which is provided at each of its ends with at least one lateral opening 4 (two in the figure). The drying member includes two couplings 5 disposed facing each other on the same axis for coupling respective ends of the sheath 2 to two ducts 6 connected to a source 7 of forced hot air. Each coupling 5 is in the form of a capsule having an inside shoulder provided with a sealing ring 8 for fitting in sealed manner over one end of the sheath 1 while leaving the lateral openings 4 uncovered, the duct 6 opening out into the coupling 5 behind the plane of the sealing ring 8 relative to the opening in the coupling. The source 7 of forced hot air conventionally comprises heater means 9, fan means 10, and a regulation system (not shown) for maintaining the flow rate and the temperature of the air forced along the ducts 6 constant and equal to predetermined values. If the ambient air sucked in by the fan means 10 has non-negligible absolute humidity, it is advantageously subjected to a drying treatment upstream from the drying apparatus so that the absolute humidity of the air passing over the ends of the fibers is as low as possible.

In order to enable the object of the invention to be achieved by this apparatus, i.e. in order to enable this apparatus to dry the ends of the bundle 1 of moist fibers and only the ends thereof, the air flow rates at the inlets to the couplings 5 are regulated and the diameters of the axial and lateral openings 3 and 4 in the sheath 2 are selected so that no flow of air is established inside the sheath 2 when the apparatus is in operation, i.e. so that all of the air entering via the axial opening 3 at each end of the sheath 2 leaves via the adjacent lateral openings 4 after passing over the ends of the fibers. In other words, the pressures at the ends of the sheath 2 are kept in equilibrium. This result can easily be achieved by providing a drying member having identical couplings 5 connected via respective ducts 6 having the same length and the same cross-section to a single source 7 of forced hot air, with the sheath 2 used for containing the bundle of fibers 1 having ends which are symmetrical.

This drying apparatus is used as follows: a bundle of fibers 1 to be dried in inserted in the sheath 2, and the sheath is then placed in the drying member by fitting the couplings 5 onto the ends of the sheath and by keeping them in place by any conventional locking means with sufficient force to ensure that the sealing rings 8 do indeed provide sealing. Once the source 7 of forced hot air is put into operation, hot air penetrates the sheath 2 via the axial openings 3 and flows between the ends of the fibers, prior to escaping via the lateral openings 4 and without flowing from one end of the sheath to the other. Once sufficient drying time has elapsed to lower the moisture content of the ends of the bundle of fibers 1, the sheath 2 is removed from the drying member and the bundle is extracted for subsequent processing.

By way of example, to dry the ends of a bundle of 8500 fibers made of AN 69 and containing about 20% water to a level enabling said bundle to be potted using glues that are presently known, the ends are subjected for about 20 minutes to a flow of air at a temperature of about 40° C. at a flow rate of about 10 cubic meters per hour.

Advantageously, when the above-described drying method and apparatus are implemented with hollow fiber bundles for fitting to membrane devices that include housings having the same characteristics as the sheath 2 (i.e. provided with axial openings and with lateral openings at their ends), as is the case for hemodialysers as mentioned above, then these housings are used to constitute the sheaths 2 in the drying apparatus, thereby making it possible to do without special sheaths and to pot the bundles directly after drying without any intermediate handling.

Figure 2:
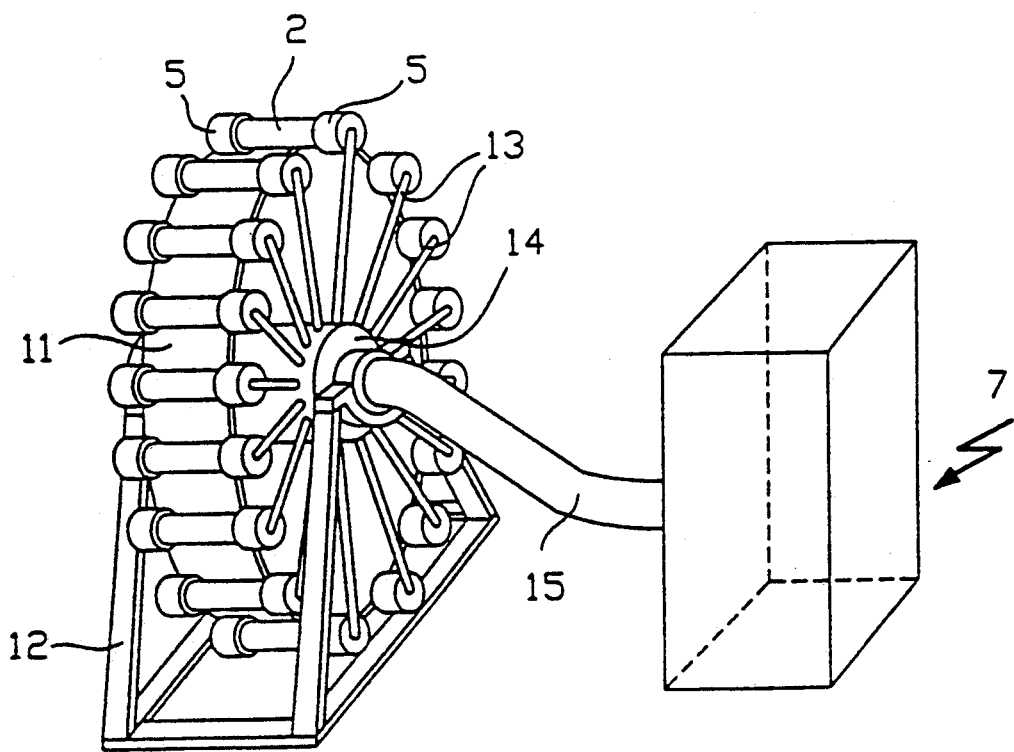
FIG. 2 is a diagrammatic perspective view of drying apparatus of the invention for drying a plurality of bundles.

FIG. 2 shows drying apparatus for a plurality of hollow fiber bundles. This apparatus comprises a carrousel constituted by a horizontal axis drum 11 mounted on a stand 12 to rotate about its axis under drive from a stepper drive member (not shown). A plurality of drying members having their axes parallel to the axis of the drum 11 are disposed at regular intervals around the periphery of the drum with the couplings 5 thereof being connected by ducts 13 of equal section and length to a central manifold 14 itself connected by a duct 15 to a single source 7 of forced hot air.

The carrousel is also fitted with an automatic loader unit and an automatic unloader unit (not shown) for simultaneously loading and unloading respectively a sheath 2 containing a moist bundle 1 and a sheath 2 containing a partially dried bundle 1, with the speed of rotation of the carrousel and with the dispositions of these loading and unloading units relative to the periphery of the carrousel being chosen so that each bundle 1 loses sufficient water from its ends to enable it to be potted, between the time it is installed on the carrousel and the time it is removed therefrom.

So that this apparatus can be used for drying bundles 1 of different lengths, the distance between the couplings 5 in each coupling member is advantageously adjustable. In addition, in order to ensure that the bundles 1 engaged on the carrousel are all treated identically, i.e. given that the temperature of the forced air and the speed of the carrousel are both kept substantially constant, in order to ensure that the ends of the bundles are subjected to air flows which remain constant regardless of the load on the carrousel, a calibrated leak system is provided at each drying member so that the same flow of air escapes from an unloaded drying member as from a drying member having a bundle-containing sheath 2 disposed thereon.

Figure 3:
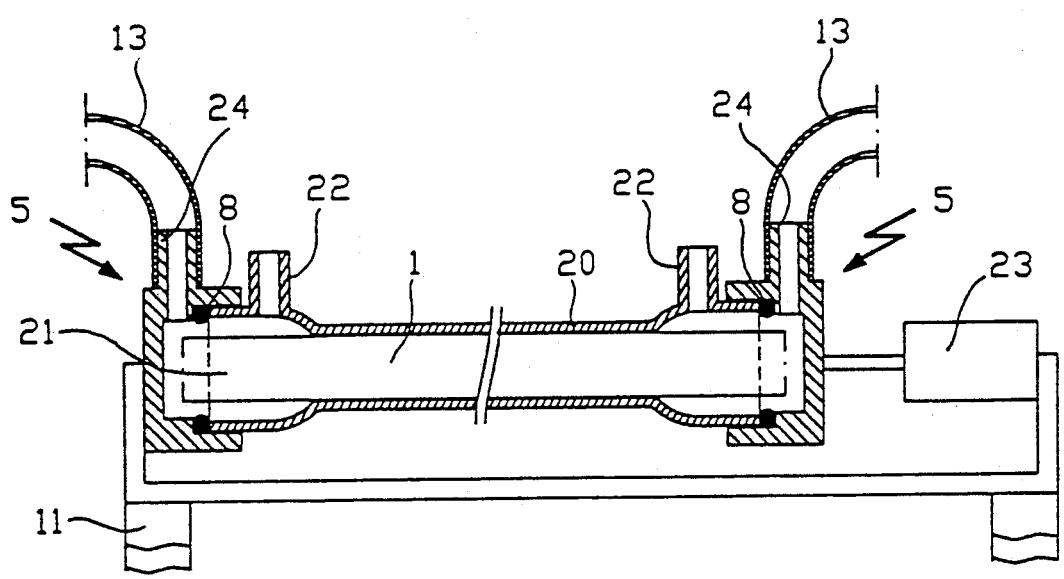
FIG. 3 is a fragmentary axial section through one embodiment of a drying member for the apparatus of the invention.

FIG. 3 shows a drying member provided with one such calibrated leak system and also fitted with means for adjusting the distance between the couplings 5. In this embodiment which is designed to dry the ends of bundles of fibers 1 for a hemodialyser of the type mentioned above, a tubular hemodialyser housing 20 is used as the sheath for the bundle 1, said housing thus including at each of its ends both an axial opening 21 and a lateral opening 22 (an inlet or outlet channel for the dialysate).

One of the couplings 5 of this drying member is fixed to the drum 11 of a carrousel in a drying apparatus as shown in FIG. 2. The other coupling 5 is mounted to move in translation relative to the stationary coupling 5 under drive from an actuator 23 which is itself fixed to the drum 11. The actuator 23 serves to move the couplings 5 apart and towards each other to enable housings 20 of different lengths to be installed and removed. When a housing 20 is installed in a drying member, the actuator is actuated to move the couplings 5 towards each other until their sealing rings 8 are slightly compressed between the ends of the housing and the inside shoulders of the couplings 5. As a result, the connections between the couplings 5 and the housing 20 are sealed in leakproof manner.

In order to ensure that the presence or absence of a housing 20 in this particular drying member has no significant effect on the distribution of hot air to the other drying members of the drying apparatus comprising a plurality of drying members, each coupling 5 is connected to the corresponding duct 13 by means of a tube 24 which opens out freely to the inside of the coupling and which has an inside diameter that is no greater than the diameter of a lateral channel 22 of a dialyser housing 20. As a result, the tube 24 gives rise to headloss on the forced air circuit such that the headloss caused by having a housing 20 installed in the drying member is negligible, in other words the tube defines a calibrated leak such that air escapes from the drying member at substantially the same rate when the member is unloaded as when the member is loaded and the air escapes via the lateral channels of a housing 20 engaged on the drying member.

The present invention is not limited to the embodiments described above, and on the contrary numerous variants will occur to the person skilled in the art.

In particular, although the drying members shown in the figures are adapted to drying substantially rectilinear bundles of hollow fibers, it is clear that by changing the respective dispositions of their couplings, they could be used for drying bundles of fibers having different configurations, in particular a U-shaped configuration. The method is also applicable to drying the ends of a bundle of fibers which is folded back on itself, in which case the sheath used is closed at one end and the drying member has only one coupling.

What is claimed is:

1. A drying method for drying the ends of a bundle of hollow fibers, the method comprising the steps of:
    placing the bundle in a sheath having at least one axial opening and at least one lateral opening at each of its ends; and
    forcing in air simultaneously via the axial openings, with the inlet air flow rates to the sheath and the sizes of the openings being selected so that all of the air penetrating at each end of the sheath leaves via the corresponding lateral opening.

2. A drying method according to claim 1, wherein the air inlet flow rates to the sheath are substantially equal, the axial openings of the sheath are of substantially equal size, and the lateral openings are of substantially equal size.

3. A drying method according to claim 1 or 2, wherein the forced air is heated.

4. A drying method according to claim 1, wherein the sheath is a membrane device housing, designed to contain the bundle of hollow fibers.

5. A drying apparatus for drying the ends of a bundle of hollow fibers for a hollow fiber membrane device, the apparatus comprising:
    means for forcing air;
    at least one drying member including two couplings, each coupling being shaped to engage opposite ends of a sheath containing the bundle of hollow fibers, and each coupling being connected to said air forcing means, said sheath including at each of its ends at least one axial opening through which air is injected into the sheath and at least one lateral opening through which air that has passed over the ends of the fibers is exhausted from the sheath.

6. A drying apparatus according to claims 5, including heater means for heating the forced air.

7. A drying apparatus according to claim 5 or 6, wherein the axial openings of the sheath are of substantially equal size, the lateral openings are of substantially equal size, and the couplings are connected to a common source of forced air via ducts having substantially the same length and substantially the same diameter.

8. A drying apparatus according to claim 5, including a plurality of drying members.

9. A drying apparatus according to claim 8, wherein each drying member includes calibrated leak means for permitting air to escape from an empty drying member and from a sheath containing a bundle installed on a drying member, at substantially equal rates.

10. A drying apparatus according to claim 5, further including means for adjusting the distance between the couplings of a particular drying member.

11. A drying apparatus according to claim 5, wherein the sheath is a housing of the membrane device, designed to contain the bundle of hollow fibers.

12. A drying apparatus for drying the ends of a bundle of hollow fibers, the apparatus comprising:
    a sheath having axial ends, at least one axial opening located at each axial end and at least one lateral opening located in proximity to each of the axial openings;
    a source of forced air; and
    couplings for connecting each of the axial openings to the source of forced air, said sheath, said axial openings, said lateral openings, said source of forced air and said couplings cooperating to direct forced air into the sheath through said axial openings and out of the sheath through respective lateral openings in order to dry the ends of the bundle.

* * * * *

UNITED STATES PATENT AND TRADEMARK OFFICE
CERTIFICATE OF CORRECTION

PATENT NO. : 5,182,868
DATED : February 2, 1993
INVENTOR(S) : Julien Porta et al It is certified that error appears in the above-indentified patent and that said Letters Patent is hereby corrected as shown below:

Claim 6, column 6, line 33, change "claims 5" to --claim 5 --.

Signed and Sealed this

Twenty-sixth Day of October, 1993

Attest:

BRUCE LEHMAN

*Attesting Officer*   *Commissioner of Patents and Trademarks*